United States Patent
Hsiao et al.

(10) Patent No.: US 10,348,203 B2
(45) Date of Patent: Jul. 9, 2019

(54) DC-TO-DC CONTROLLER, DC-TO-DC POWER CONVERTER AND CONTROL METHOD THEREOF

(71) Applicant: uPI Semiconductor Corp., Hsinchu County (TW)

(72) Inventors: Chih-Wen Hsiao, Hsinchu County (TW); Chih-Lien Chang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 1 day.

(21) Appl. No.: 15/889,091

(22) Filed: Feb. 5, 2018

(65) Prior Publication Data
US 2018/0337598 A1 Nov. 22, 2018

(30) Foreign Application Priority Data
May 17, 2017 (TW) .............................. 106116255 A

(51) Int. Cl.
*H02M 3/158* (2006.01)
*H02M 1/44* (2007.01)
*H02M 3/156* (2006.01)
*H02M 1/00* (2006.01)

(52) U.S. Cl.
CPC .............. *H02M 3/158* (2013.01); *H02M 1/44* (2013.01); *H02M 3/156* (2013.01); *H02M 2001/0025* (2013.01); *H02M 2001/0041* (2013.01)

(58) Field of Classification Search
CPC ...... H02M 3/158; H02M 3/156; H02M 3/155; H02M 3/157; H02M 3/1563
USPC .................................. 323/222, 271, 282–285
See application file for complete search history.

(56) References Cited

U.S. PATENT DOCUMENTS

| | | | |
|---|---|---|---|
| 6,580,258 B2 | 6/2003 | Wilcox et al. | |
| 7,560,910 B2* | 7/2009 | Hata ....................... | H02M 1/32 323/222 |
| 7,750,609 B2* | 7/2010 | Omi ........................ | H02M 1/36 323/222 |
| RE43,538 E | 7/2012 | Solie et al. | |
| 2011/0227549 A1* | 9/2011 | Huang ................ | H02M 3/1588 323/282 |
| 2014/0117959 A1* | 5/2014 | Costa .................... | H02M 3/157 323/282 |
| 2014/0191736 A1* | 7/2014 | Babazadeh ......... | H02M 3/1582 323/271 |

(Continued)

*Primary Examiner* — Nguyen Tran
(74) *Attorney, Agent, or Firm* — JCIPRNET

(57) ABSTRACT

A DC-to-DC controller, a DC-to-DC power converter and a control method thereof are provided. The controller is coupled to an upper-bridge switch and a lower-bridge switch and includes a time generation unit providing a time signal, a voltage identification (VID) change determining circuit and a time control circuit. The VID change determining circuit provides a determination signal in response to a VID signal. The time control circuit provides a control signal according to the time signal and the determination signal. When the VID signal changes from high to low, the time control circuit turns off the upper-bridge switch for a first preset time according to the determination signal and the time signal, and during the first preset time, the time control circuit controls the lower-bridge switch to be turned on for a second preset time multiple times, and to be turned off for a third preset time multiple times.

10 Claims, 8 Drawing Sheets

(56) References Cited

U.S. PATENT DOCUMENTS

2015/0077081 A1* 3/2015 Ejury .................. H02M 7/538
                                                         323/282

* cited by examiner

US 10,348,203 B2

DC-TO-DC CONTROLLER, DC-TO-DC POWER CONVERTER AND CONTROL METHOD THEREOF

CROSS-REFERENCE TO RELATED APPLICATION

This application claims the priority benefit of Taiwan application serial no. 106116255, filed on May 17, 2017. The entirety of the above-mentioned patent application is hereby incorporated by reference herein and made a part of this specification.

BACKGROUND OF THE INVENTION

Field of the Invention

The invention relates to a controller and particularly relates to a DC-to-DC controller, a DC-to-DC power converter and a control method thereof.

Description of Related Art

FIG. 1A is a schematic view of a conventional DC-to-DC buck converter. In a typical buck converter 10, an error amplifier circuit 16 generates an error signal EA according to an output voltage Vout1 (or a feedback voltage related to the output voltage Vout1) and a reference voltage VRef. A time generation unit 14 generates a time signal STX1 according to the error signal EA, and, correspondingly to the time signal STX1, a driver 15 generates an upper-bridge control signal UG1 and a lower-bridge control signal LG1 to an output stage 11, so as to adjust the output voltage Vout1.

FIG. 1B is a schematic view of waveforms of a conventional output stage. When voltage identification (VID) of a central processing unit (CPU) changes, the related reference voltage VRef changes accordingly. When the VID changes from high to low, a conventional feedback control method is to continuously turn off an upper-bridge switch Q1 and turn on a lower-bridge switch Q2. A current is released via the lower-bridge switch Q2 to reduce the output voltage Vout1 until the output voltage Vout1 becomes equal to the reference voltage VRef. However, the continuous turn-on of the lower-bridge switch Q2 may cause a large negative current (not illustrated in FIG. 1B) on an output inductor L1 and cause undershoot in the output voltage Vout1, resulting in an unstable output. An excessively large negative current may even burn out the output inductor L1.

SUMMARY OF THE INVENTION

The invention provides a DC-to-DC output stage controller, a DC-to-DC power converter and a control method thereof, capable of reducing undershoot to stabilize output.

The DC-to-DC controller of the invention is coupled to an upper-bridge switch and a lower-bridge switch and includes a time generation unit, a voltage identification (VID) change determining circuit and a time control circuit. The time generation unit provides a time signal. The VID change determining circuit provides a determination signal in response to a VID signal changing from high to low. The time control circuit is coupled to the time generation unit and the VID change determining circuit, and provides a control signal according to the time signal and the determination signal. When the VID signal changes from high to low, the time control circuit turns off the upper-bridge switch for a first preset time according to the determination signal and the time signal, and during the first preset time, the time control circuit controls the lower-bridge switch to be turned on for a second preset time multiple times and to be turned off for a third preset time multiple times, wherein the second preset time is greater than the third preset time.

The DC-to-DC power converter of the invention includes an upper-bridge switch, a lower-bridge switch, a time generation unit, a VID change determining circuit and a time control circuit. The time generation circuit provides a time signal. The VID change determining circuit provides a determination signal in response to a VID signal changing from high to low. The time control circuit is coupled to the time generation unit and the VID change determining circuit, and provides a control signal according to the time signal and the determination signal. When the VID signal changes from high to low, the time control circuit turns off the upper-bridge switch for a first preset time according to the determination signal and the time signal, and during the first preset time, the time control circuit controls the lower-bridge switch to be turned on for a second preset time multiple times and to be turned off for a third preset time multiple times, wherein the second preset time is greater than the third preset time.

The control method of the DC-to-DC power converter of the invention is used to control an upper-bridge switch and a lower-bridge switch. The control method includes the following steps. Whether VID changes from high to low is determined. The upper-bridge switch is turned off for a first preset time. During the first preset time, the lower-bridge switch is turned on for a second preset time multiple times and turned off for a third preset time multiple times, wherein the second preset time is greater than the third preset time.

Based on the above, in the DC-to-DC controller, the DC-to-DC power converter and the control method thereof according to the embodiments of the invention, when the VID signal changes from high to low, the upper-bridge switch is turned off for the first preset time, and during the first preset time, the lower-bridge switch is controlled to be turned on for the second preset time multiple times and to be turned off for the third preset time multiple times, wherein the second preset time is greater than the third preset time. Accordingly, undershoot in the output voltage can be reduced, thus further preventing the output voltage from becoming unstable. On the other hand, it can be prevented that an excessively large negative current burns out the output inductor.

To make the aforementioned and other features and advantages of the invention more comprehensible, several embodiments accompanied with drawings are described in detail as follows.

DESCRIPTION OF THE EMBODIMENTS

Figure 1A:
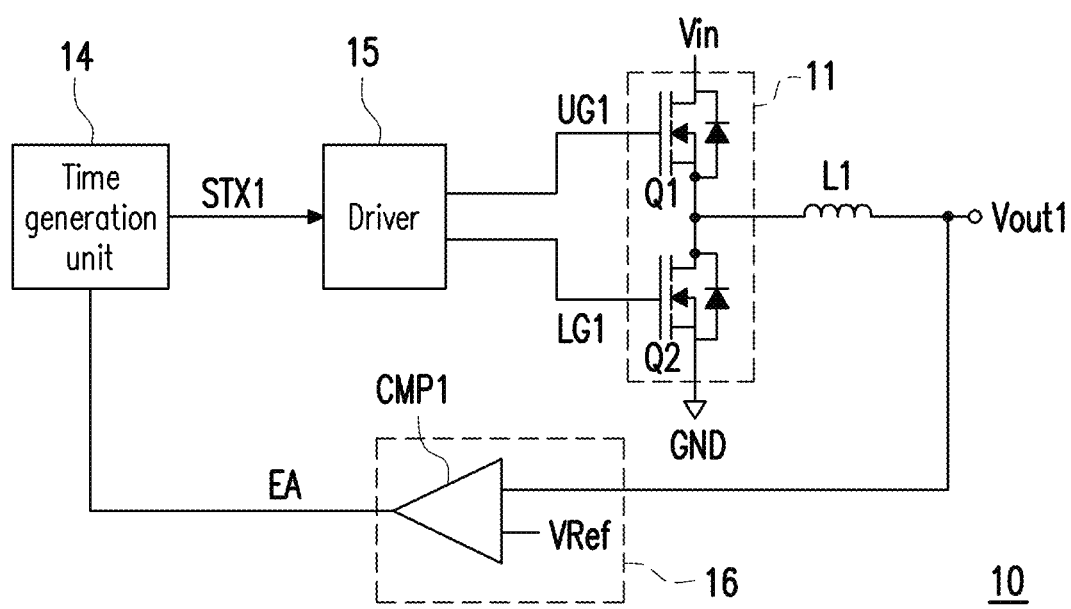
FIG. 1A is a schematic view of a system of a conventional DC-to-DC buck converter.
Figure 1B:
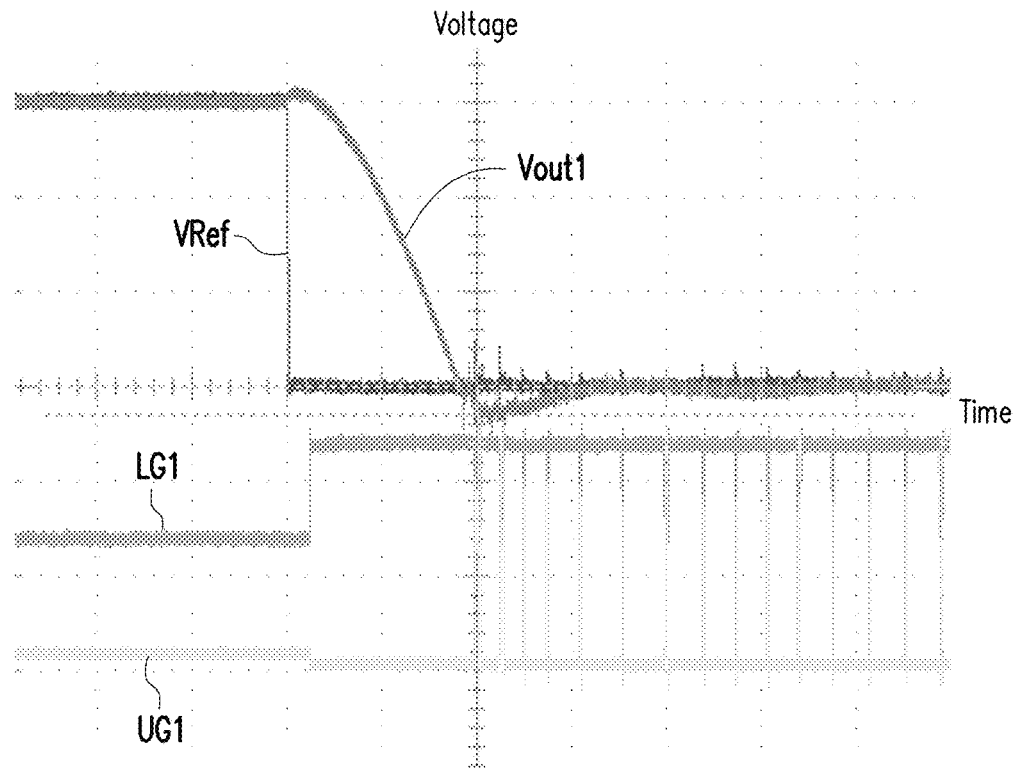
FIG. 1B is a schematic view of waveforms of a conventional DC-to-DC buck converter.
Figure 2A:
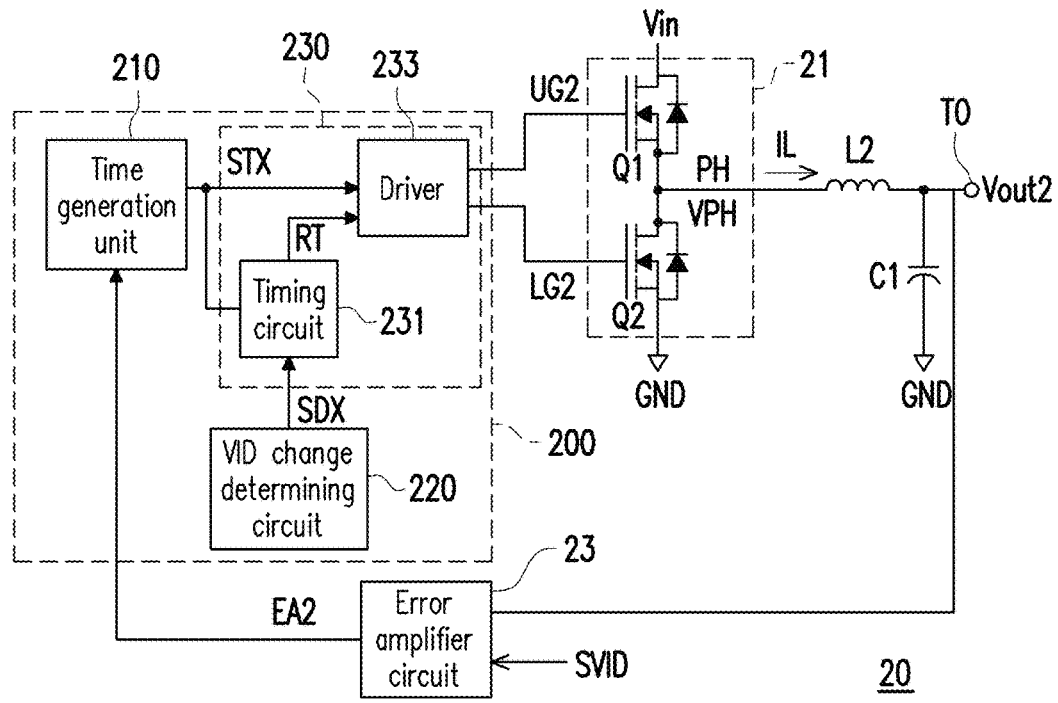
FIG. 2A is a schematic view of a system of a DC-to-DC power converter according to an embodiment of the invention.

FIG. 2A is a schematic view of a system of a DC-to-DC power converter according to an embodiment of the invention. In this embodiment, a DC-to-DC power converter 20 includes an output stage 21, an error amplifier circuit 23, a DC-to-DC controller 200, an output inductor L2 and an output capacitor C1.

The output stage 21 includes an upper-bridge switch Q1 (here, e.g. a transistor) and a lower-bridge switch Q2 (here, e.g. a transistor) respectively controlled by an upper-bridge control signal UG2 and a lower-bridge control signal LG2. A phase node PH is located between the upper-bridge switch Q1 and the lower-bridge switch Q2.

The output inductor L2 is coupled between the output stage 21 and an output terminal TO. During an operation of the DC-to-DC power converter, an inductor current IL is present between the phase node PH and the output inductor L2, and the error amplifier circuit 23 receives an output voltage Vout2 and a VID signal SVID to provide an error signal EA2 to a time generation unit 210.

The DC-to-DC controller 200 includes the time generation unit 210, a VID change determining circuit 220 and a time control circuit 230. The time generation unit 210 provides a time signal STX according to the error signal EA2. The VID change determining circuit 220 determines whether a voltage level of the VID signal SVID changes from high to low and provides a determination signal SDX in response to the VID signal SVID changing from high to low. The time control circuit 230 is coupled to the time generation unit 210 and the VID change determining circuit 220 to receive the time signal STX and the determination signal SDX, and provides the control signals (e.g., including the upper-bridge control signal UG2 and the lower-bridge control signal LG2) according to the time signal STX and the determination signal SDX, so as to control the upper-bridge switch Q1 and the lower-bridge switch Q2.

In this embodiment, the time control circuit 230 includes a timing circuit 231 and a driver 233. The timing circuit 231 receives the determination signal SDX and the time signal STX to provide a timing result RT to the driver 233. The driver 233 provides the upper-bridge control signal UG2 and the lower-bridge control signal LG2 according to the time signal STX and the timing result RT.

In the embodiments of the invention, the time signal STX may be an on-time signal or an off-time signal, but the embodiments of the invention are not limited thereto. By observing whether the inductor current IL has a negative value, the VID change determining circuit 220 determines whether the voltage level of the VID signal SVID changes from high to low and correspondingly provides the determination signal SDX.

Figure 2B:
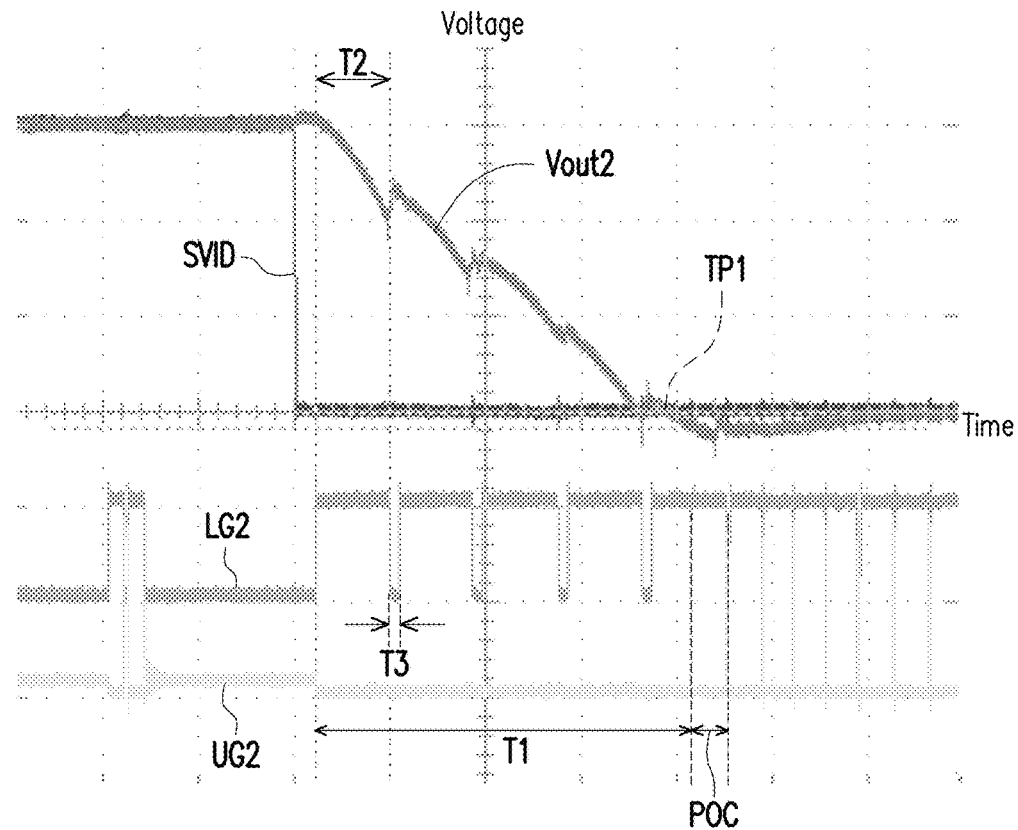
FIG. 2B is a schematic view of waveforms of an output stage of a DC-to-DC power converter according to an embodiment of the invention.

FIG. 2B is a schematic view of waveforms of a DC-to-DC power converter according to an embodiment of the invention. Referring to FIG. 2A and FIG. 2B, when the VID signal SVID changes from high to low, the time control circuit 230 disables the upper-bridge control signal UG2 for a first preset time T1, and that is, the upper-bridge switch Q1 is turned off for the first preset time T1. Then, during the first preset time T1, the time control circuit 230 controls the lower-bridge switch Q2 to be turned on for a second preset time T2 multiple times and to be turned off for a third preset time T3 multiple times.

Further, when the time signal STX indicates that the upper-bridge switch Q2 is off, and that is, the upper-bridge control signal UG2 is disabled, the driver 233 enables the lower-bridge control signal LG2 (namely, turns on the lower-bridge switch Q2) according to the timing result RT provided by the timing circuit 231. When the timing circuit 231 has timed for the second preset time T2, the timing circuit 231 notifies the driver 233 via the timing result RT to control the driver 233 to disable the lower-bridge control signal LG2 (namely, turns off the lower-bridge switch Q2). Then, the timing circuit 231 re-times, and when the timing circuit 231 has timed for the third preset time T3, the timing circuit 231 similarly notifies the driver 233 via the timing result RT to control the driver 233 to enable the lower-bridge control signal LG2 (namely, turns on the lower-bridge switch Q2).

Based on the above, when the upper-bridge switch Q1 and the lower-bridge switch Q2 are turned off at the same time, a negative current of the phase node PH is released via a body diode of the transistor of the upper-bridge switch Q1. Moreover, after the third preset time T3 has passed, the lower-bridge control signal LG2 is enabled again to turn on the lower-bridge switch Q2 again to continue to release the output voltage Vout2.

In this embodiment, the first preset time T1 is greater than an original turn-on period POC of the lower-bridge switch Q2, and the second preset time T2 is greater than the third preset time T3. For instance, assuming that in a normal state, constant on time (COT) is set at 300 kHz, a single original turn-on period of the lower-bridge switch Q2 is about 3 to 4 µs. Thus, the first preset time T1 is greater than an original turn-on period of the lower-bridge switch Q2. The second preset time T2 may be set greater than 4 µs, for example, 8 µs, and the third preset time T3 may be set depending on a circuit design and is far less than the second preset time T2, for example, 1 µs herein.

When the output voltage Vout2 is equal to the VID signal SVID (as shown at a time point TP1), and that is, the output voltage Vout2 reaches a settling time from a transient period. At this time, the upper-bridge control signal UG2 changes to be periodically enabled so that the upper-bridge switch Q1 is periodically turned on. When the time signal STX indicates that the upper-bridge switch Q1 is turned on, the time control circuit 230 may reset the timing result to prevent the output voltage Vout2 from being affected by an abnormal turn-off of the lower-bridge switch Q2.

Based on the above, when the VID signal SVID changes downwards, the lower-bridge switch Q2 is turned on for a fixed time (e.g., 8 µs) before being turned off for a short time (e.g., 1 µs). Turning on the lower-bridge switch Q2 to release the output voltage Vout2, and then turning off the lower-bridge switch Q2 for a short time can prevent the current of the inductor L2 prevented from being pulled down too much. At this time, the upper-bridge switch Q1 remains turned-off until the output voltage Vout2 becomes equal to the VID signal SVID.

In the embodiments of the invention, the VID change determining circuit 220 determines whether a negative current is generated at the phase node PH according to a phase voltage VPH at the phase node PH in the output stage 21; or, the VID change determining circuit 220 determines whether a negative current is generated at the phase node PH by detecting a current on the output inductor L2.

Figure 3A:
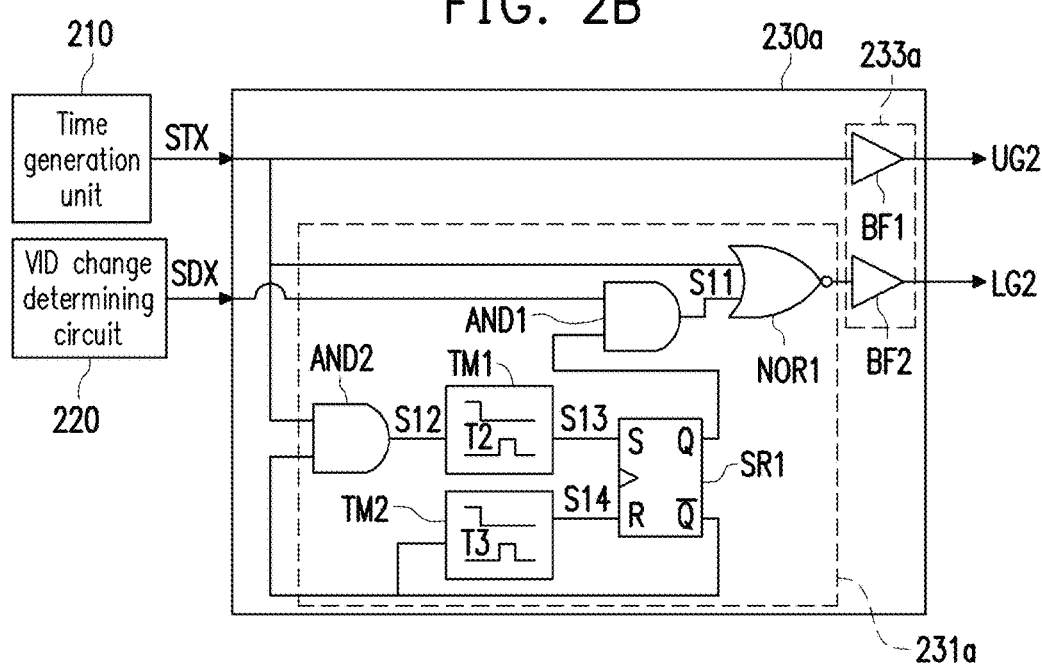
FIG. 3A is a schematic circuit view of a time control circuit according to an embodiment of the invention.

FIG. 3A is a schematic circuit view of a time control circuit according to an embodiment of the invention. Referring to FIG. 2A and FIG. 3A, in this embodiment, a time control circuit 230a includes a timing circuit 231a and a driver 233a. The timing circuit 231a includes timers TM1 and TM2, and the driver 233a includes buffers BF1 and BF2.

The timing circuit 231a receives the time signal STX and the determination signal SDX and is coupled to the buffer BF2. The buffer BF1 is coupled respectively to the time generation unit 210 and the output stage 21 to receive the time signal STX to provide the upper-bridge control signal UG2. The buffer BF2 couples respectively to the timing circuit 231a and the output stage 21 to provide the lower-bridge control signal LG2.

Figure 3B:
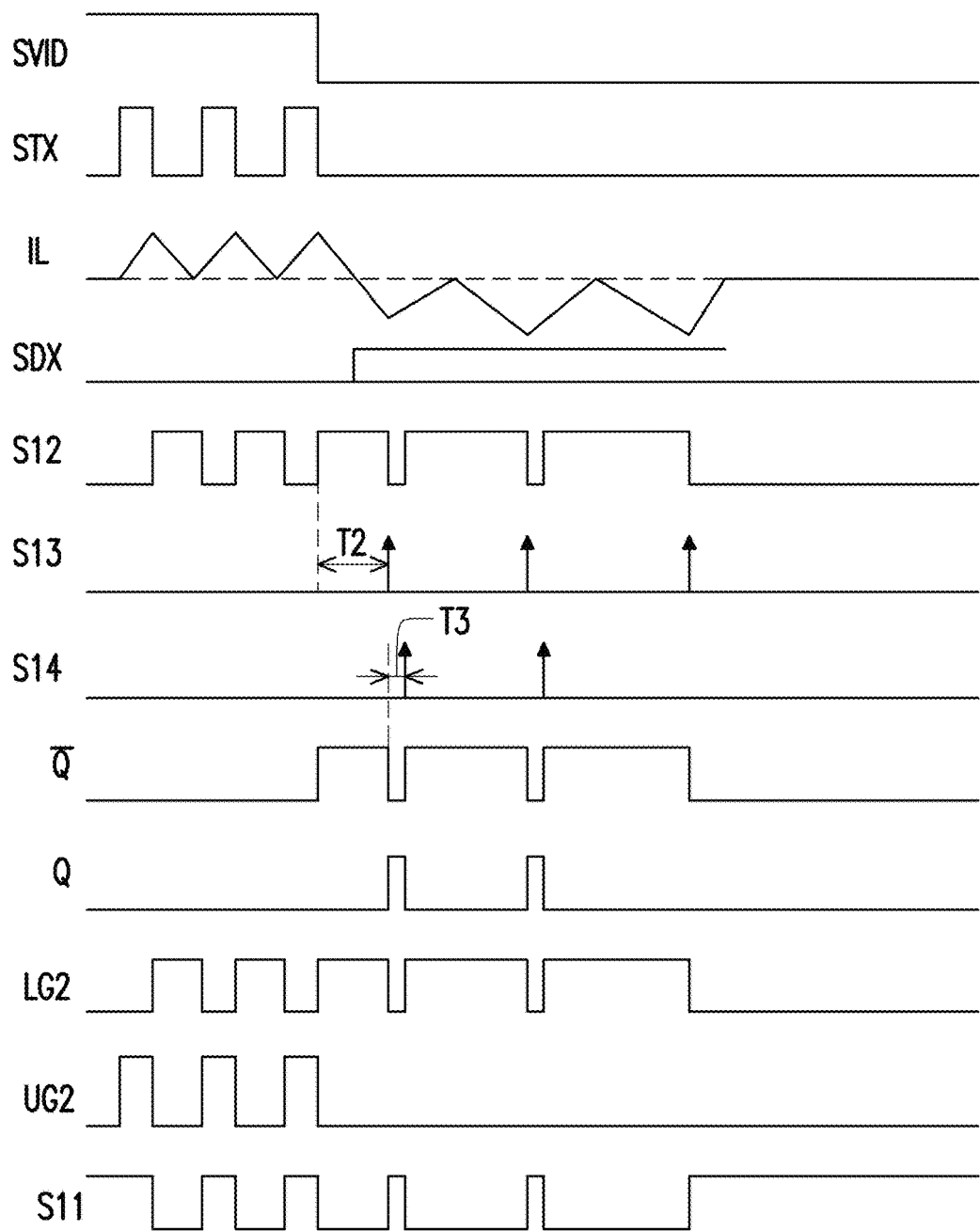
FIG. 3B is a schematic diagram of driving waveforms of a time control circuit according to an embodiment of the invention.

FIG. 3B is a schematic diagram of driving waveforms of a time control circuit according to an embodiment of the invention. Referring to FIG. 2A, FIG. 3A and FIG. 3B, when the VID signal SVID changes from high to low, the time signal STX changes to a low voltage level in response to the VID signal SVID. At this time, the upper-bridge control signal UG2 is disabled so that the upper-bridge switch Q1 is turned off (i.e. not conducted).

In the meanwhile, since the time signal STX is inverted by a NOR gate NOR1, the lower-bridge control signal LG2 is enabled so that the lower-bridge switch Q2 is turned on. Meanwhile, the time signal STX triggers the timer TM1 to start timing the second preset time T2 through an AND gate AND2.

When the timer TM1 has timed for the second preset time T2 and the time signal STX has not changed, the timer TM1 sends a trigger pulse to an SR flip-flop SR1 to cause an output signal Q of the SR flip-flop SR1 to be at a high voltage level. At this time, if the inductor current IL is negative to cause the determination signal SDX to be at a high voltage level, the lower-bridge control signal LG2 is disabled by action of an AND gate AND1 and the NOR gate NOR1, so that the lower-bridge switch Q2 is turned off. At this time, the SR flip-flop SR1 triggers the timer TM2 to start timing the third preset time T3.

When the timer TM2 has timed for the third preset time T3, the timer TM2 sends a trigger pulse to reset the SR flip-flop SR1, so as to cause the output signal Q of the SR flip-flop SR1 to be at a low voltage level, and the lower-bridge control signal LG2 is enabled through the AND gate AND1 and the NOR gate NOR1, so that the lower-bridge switch Q2 is turned on. Meanwhile, the timer TM1 resets and re-times the second preset time T2.

Figure 4A:
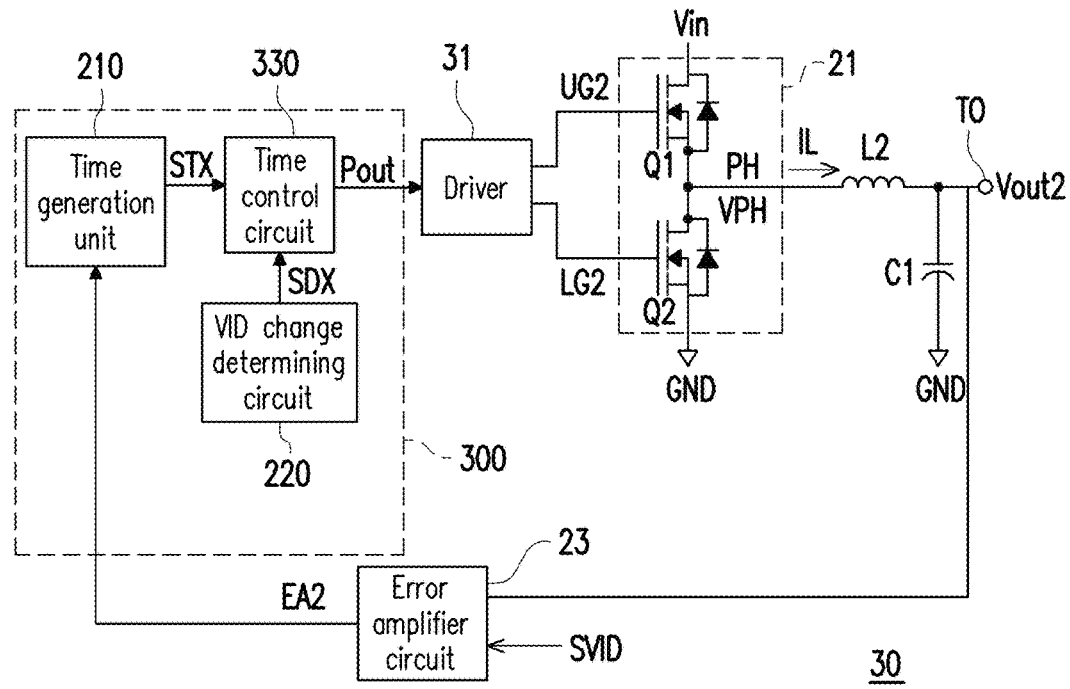
FIG. 4A is a schematic view of a system of a DC-to-DC power converter according to another embodiment of the invention.

FIG. 4A is a schematic view of a system of a DC-to-DC power converter according to another embodiment of the invention. Referring to FIG. 2A and FIG. 4A, a DC-to-DC power converter 30 is roughly the same as the DC-to-DC power converter 20. A difference between them is that a DC-to-DC controller 300 does not include a driver 31. A time control circuit 330 provides a control signal Pout to the driver 31. The driver 31 is coupled respectively to the upper-bridge switch Q1 and the lower-bridge switch Q2, and provides the upper-bridge control signal UG2 and the lower-bridge control signal LG2 according to the control signal Pout to control the upper-bridge switch Q1 and the lower-bridge switch Q2. Identical or similar components are denoted by identical or similar reference numerals.

Figure 4B:
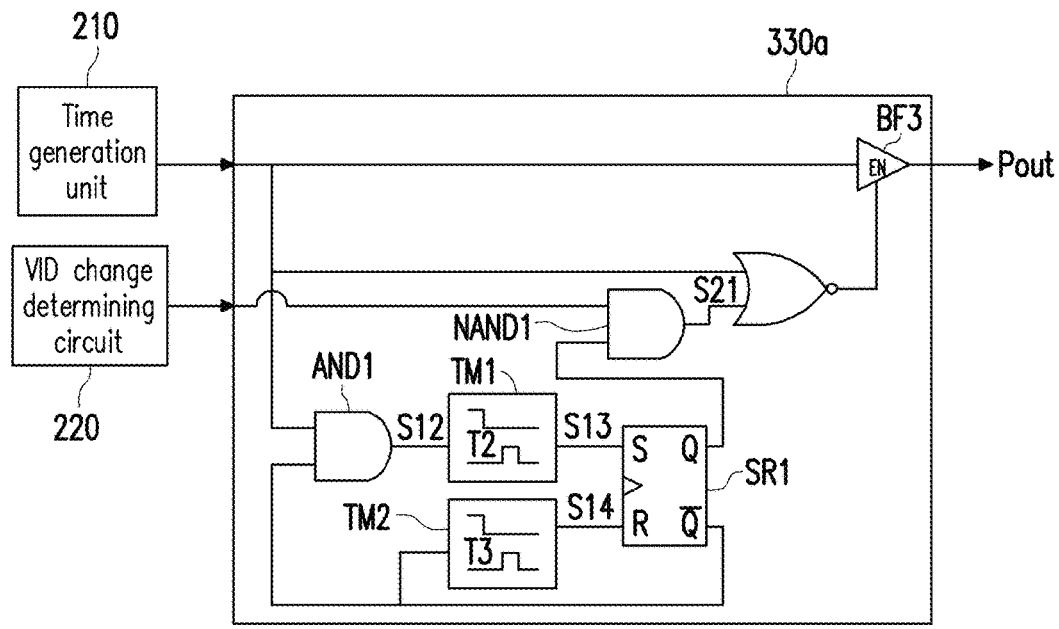
FIG. 4B is a schematic circuit view of a time control circuit according to another embodiment of the invention.

FIG. 4B is a schematic circuit view of a time control circuit according to another embodiment of the invention. Referring to FIG. 3A and FIG. 4B, a time control circuit 330a is roughly the same as the time control circuit 230a. A difference between them is that the time control circuit 230a further includes the driver 233a, and logic gates in the timing circuit have different designs according to different types of output signals. Identical or similar components are denoted by identical or similar reference numerals.

In this embodiment, a buffer BF3 receives the time signal STX to provide the control signal Pout, and has an enable end EN coupled to the NOR gate NOR1. According to a signal sent by the NOR gate NOR1, the control signal Pout generated by the buffer BF3 may be in three states, namely enabled state, disabled state and tri-state. Tri-state is that a voltage level is between a high voltage level and a low voltage level.

Figure 4C:
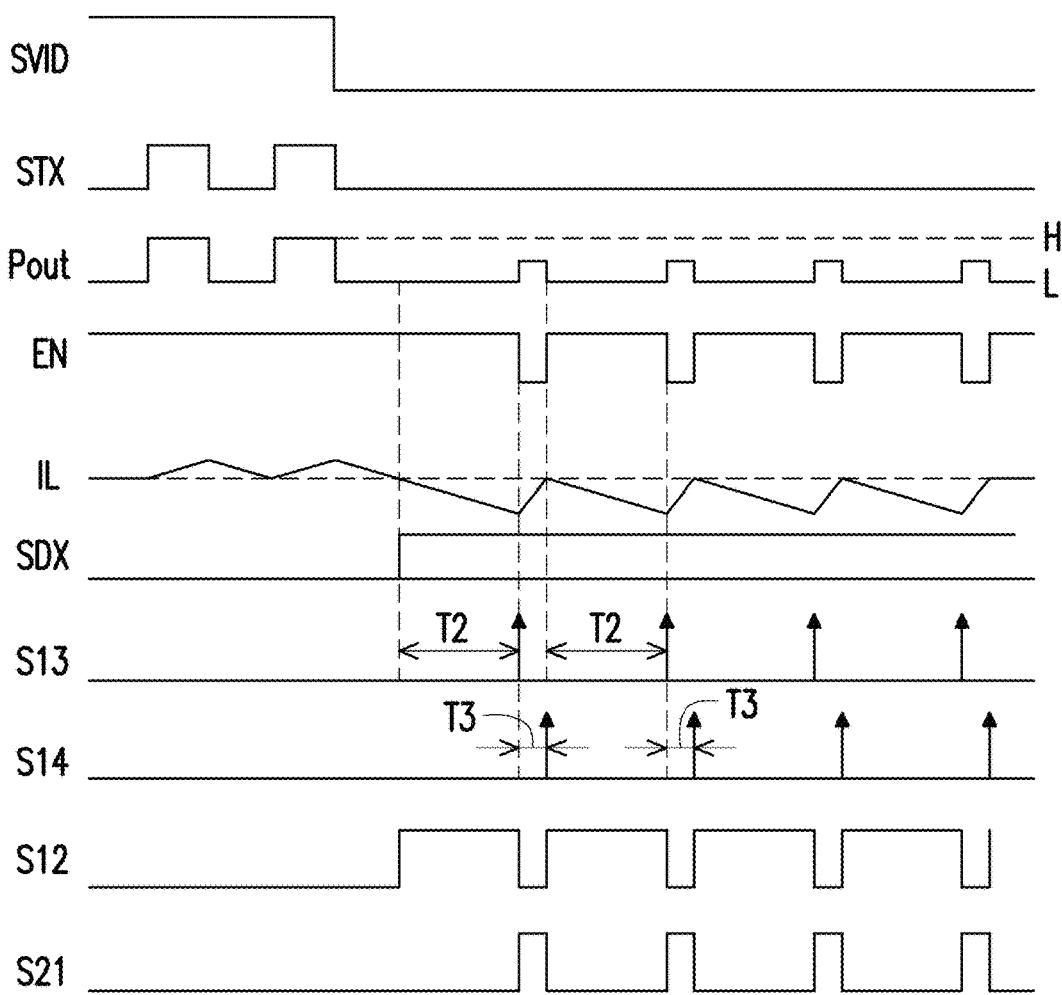
FIG. 4C is a schematic diagram of driving waveforms of a time control circuit according to another embodiment of the invention.

FIG. 4C is a schematic diagram of driving waveforms of a time control circuit according to another embodiment of the invention. Referring to FIG. 4A, FIG. 4B and FIG. 4C, when the VID signal SVID changes from high to low, the time generation unit 210 changes the time signal STX to a low voltage level in response to the VID signal SVID. At this time, the control signal Pout is synchronized to the low voltage level so that the upper-bridge switch Q1 is turned off (i.e. not conducted) and the lower-bridge switch Q2 is turned on.

Meanwhile, the time signal STX triggers the timer TM1 via the AND gate AND2 to start timing the second preset time T2. When the timer TM1 has timed for the second preset time T2 and the time signal STX has not changed, the timer TM1 sends a trigger pulse to the SR flip-flop SR1, so as to trigger the timer TM2 via the SR flip-flop SR1 to start timing the third preset time T3.

When the timer TM2 has timed for the third preset time T3, the timer TM2 sends a trigger pulse to reset the SR flip-flop SR1 and the timer TM1 so as to re-time the second preset time T2. During the third preset time T3, if the inductor current IL of the phase node PH is negative or the inductor current IL of the output inductor L2 is negative, the determination signal SDX is at a high voltage level so that the control signal Pout is in the tri-state. At this time, the driver 31 disables both the upper-bridge control signal UG2 and the lower-bridge control signal LG2 in response to the tri-state of the control signal Pout, so as to simultaneously turn off the upper-bridge switch Q1 and the lower-bridge switch Q2.

Figure 5:
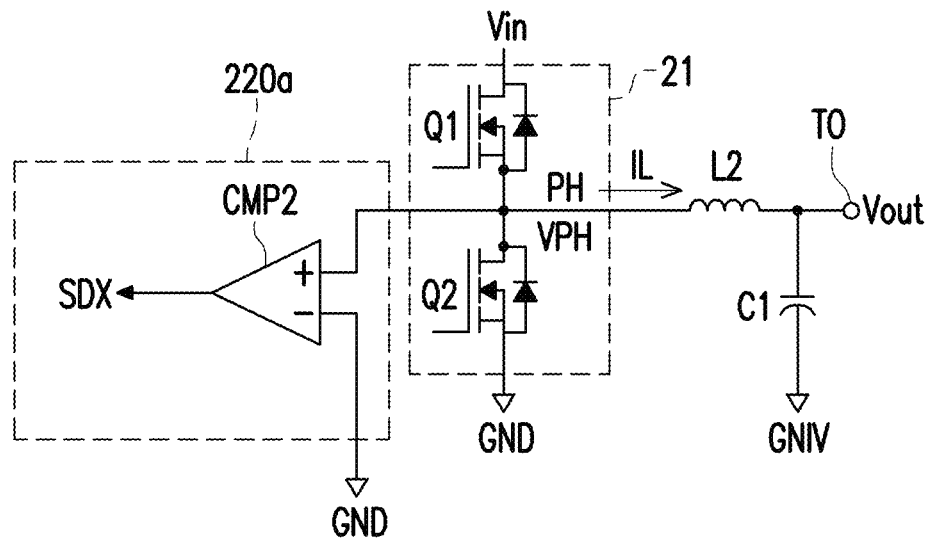
FIG. 5 is a schematic view of a determination mode of a VID change determining circuit according to an embodiment of the invention.

FIG. 5 is a schematic view of a determination mode of a VID change determining circuit according to an embodiment of the invention. Referring to FIG. 2A and FIG. 5, in this embodiment, a VID change determining circuit 220a includes a comparator CMP2 to receive the phase voltage VPH and a ground voltage (namely, a voltage of a ground end GND) to generate the determination signal SDX, and the VID change determining circuit 220a determines whether the inductor current IL of the phase node PH has a negative value according to the determination signal SDX. That is, the VID change determining circuit 220a determines whether the inductor current IL flowing through the phase node PH has a negative value according to a voltage value of the phase node PH.

Figure 6:
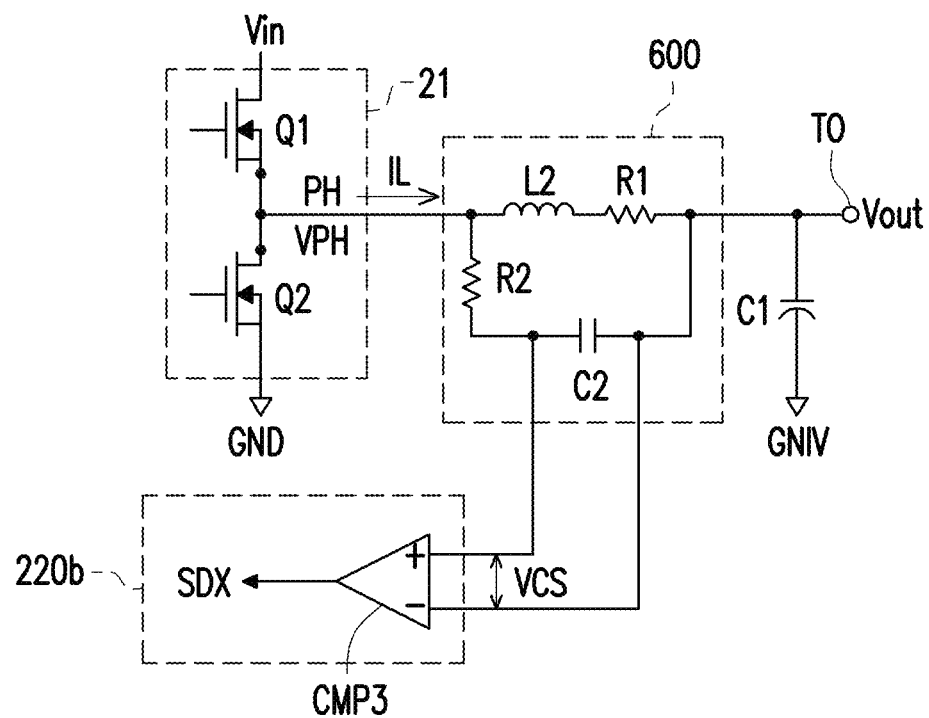
FIG. 6 is a schematic view of a determination mode of a VID change determining circuit according to another embodiment of the invention.

FIG. 6 is a schematic view of a determination mode of a VID change determining circuit according to another embodiment of the invention. Referring to FIG. 2A and FIG. 6, in this embodiment, the DC-to-DC power converter (e.g., 20 and 30) further including resistors R1 and R2, and a capacitor C2, and forms a current detecting circuit 600 with the output inductor L2. The current detecting circuit 600 is coupled to the phase node PH and generates a current sensing voltage VCS at two ends of the capacitor C2 correspondingly to a detection result. A VID change determining circuit 220b receives the current sensing voltage VCS to determine whether the inductor current IL flowing through the phase node PH and the inductor L2 has a negative value.

In this embodiment, the VID change determining circuit 220b includes a comparator CMP3 to receive the current sensing voltage VCS to generate the determination signal SDX, so as to determine whether the inductor current IL flowing through the phase node PH and the inductor L2 has a negative value according to a voltage value of the current sensing voltage VCS.

Figure 7:
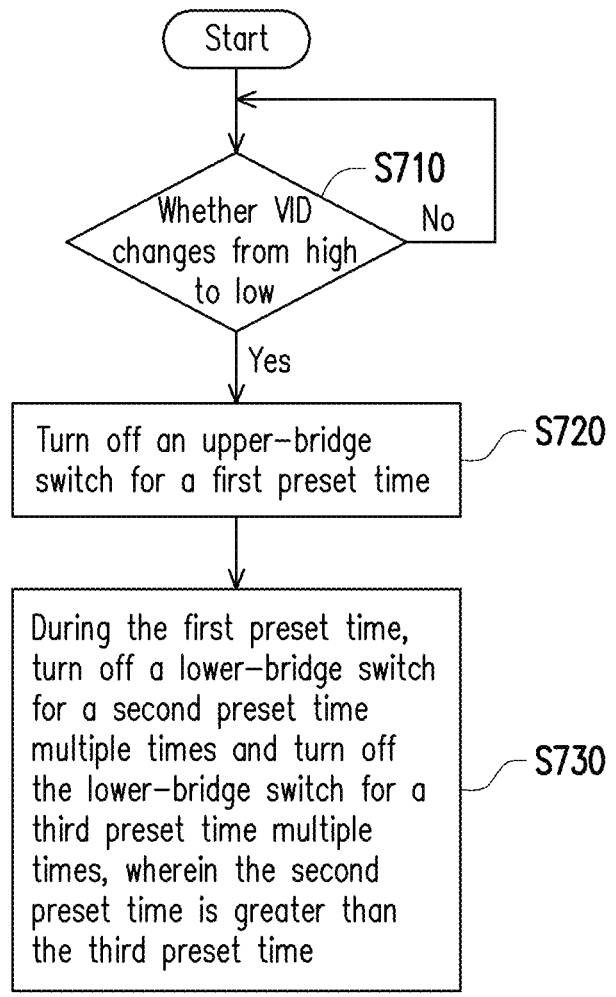
FIG. 7 is a flowchart of a control method of a DC-to-DC power converter according to an embodiment of the invention.

FIG. 7 is a flowchart of a control method of a DC-to-DC power converter according to an embodiment of the invention. Referring to FIG. 7, in this embodiment, the control method of the DC-to-DC power converter includes the following steps. In step S710, whether VID changes from high to low is determined. When the VID changes from high to low, a determination result in step S710 is "Yes", and step S720 is performed; when the VID does not change from high to low, the determination result in step S710 is "No", and the process returns to step S710.

In step S720, the upper-bridge switch is turned off for a first preset time. Then, in step S730, during the first preset time, the lower-bridge switch is turned on for a second preset time multiple times and turned off for a third preset time multiple times and the second preset time is greater than the third preset time. The order of the above steps S710, S720 and S730 is for description purposes and the embodiments of the invention are not limited thereto. Further, regarding the details of steps S710, S720 and S730, please refer to the embodiments of FIG. 2A, FIG. 2B, FIG. 3A, FIG. 3B, FIG. 4A to FIG. 4C, FIG. 5 and FIG. 6, and the details are omitted herein.

To sum up, in the DC-to-DC controller, the DC-to-DC power converter and the control method thereof of the embodiments of the invention, when the VID signal changes from high to low, the upper-bridge switch is controlled to be turned off for the first preset time, and during the first preset time, the lower-bridge switch is controlled to be turned on for the second preset time multiple times and to be turned off for the third preset time multiple times, wherein the second preset time is greater than the third preset time. In this way, it can be prevented that the inductor current is released via the lower-bridge switch and pulled too much to cause undershoot in the output voltage. Thus, an unstable output can be prevented.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A DC-to-DC controller, coupled to an upper-bridge switch and a lower-bridge switch, the DC-to-DC controller comprising:
   a time generation unit, providing a time signal;
   a voltage identification (VID) change determining circuit, providing a determination signal in response to a VID signal changing from high to low; and
   a time control circuit, coupled to the time generation unit and the VID change determining circuit, and providing a control signal according to the time signal and the determination signal;
   wherein when the VID signal changes from high to low and a negative current is detected, the time control circuit turns off the upper-bridge switch for a first preset time according to the determination signal and the time signal, and during the first preset time, the time control circuit controls the lower-bridge switch to be turned on for a second preset time multiple times and to be turned off for a third preset time multiple times,
   wherein the second preset time is greater than the third preset time.

2. The DC-to-DC controller according to claim 1, wherein the control signal is a signal having three voltage levels, and during the third preset time, the control signal is in a tri-state.

3. The DC-to-DC controller according to claim 1, wherein the first preset time is greater than an original turn-on period of the lower-bridge switch.

4. The DC-to-DC controller according to claim 1, wherein the VID change determining circuit receives a voltage value at a phase node between the upper-bridge switch and the lower-bridge switch to determine whether a current of the phase node has a negative value.

5. The DC-to-DC controller according to claim 1, further comprising a current detecting circuit, coupled to a phase node between the upper-bridge switch and the lower-bridge switch, and providing a detection result for the VID change determining circuit to determine whether a current of the phase node has a negative value.

6. The DC-to-DC controller according to claim 1, wherein the time control circuit comprises a first timer to time the second preset time, and a second timer to time the third preset time.

7. A DC-to-DC power converter, comprising:
   an upper-bridge switch and a lower-bridge switch;
   a time generation unit, providing a time signal;
   a VID change determining circuit, providing a determination signal in response to a VID signal changing from high to low; and
   a time control circuit, coupled to the time generation unit and the VID change determining circuit, and providing a control signal according to the time signal and the determination signal;
   wherein when the VID signal changes from high to low and a negative current is detected, the time control circuit controls the upper-bridge switch to be turned off for a first preset time according to the determination signal and the time signal, and during the first preset time, the time control circuit controls the lower-bridge switch to be turned on for a second preset time multiple times and to be turned off for a third preset time multiple times,
   wherein the second preset time is greater than the third preset time.

8. A control method of a DC-to-DC power converter, for controlling an upper-bridge switch and a lower-bridge switch, the method comprising:
   determining whether a VID signal changes from high to low and a negative current to provide a determination signal by a VID change determining circuit;
   providing a control signal to the upper-bridge switch and the lower-bridge switch according to a time signal and the determination signal by a time control circuit;
   turning off the upper-bridge switch for a first preset time by the time control circuit; and during the first preset time, turning on the lower-bridge switch for a second preset time multiple times and turning off the lower-bridge switch for a third preset time multiple times by the time control circuit, wherein the second preset time is greater than the third preset time.

9. The control method of a DC-to-DC power converter according to claim 8, wherein the first preset time is greater than an original turn-on period of the lower-bridge switch.

10. The control method of a DC-to-DC power converter according to claim 8, comprising determining whether the VID signal changes from high to low according to an inductor current between the upper-bridge switch and the lower-bridge switch.

* * * * *